United States Patent [19]

Sogo

[11] Patent Number: 5,641,565

[45] Date of Patent: Jun. 24, 1997

[54] SEPARATOR FOR A BATTERY USING AN ORGANIC ELECTROLYTIC SOLUTION AND METHOD FOR PREPARING THE SAME

[75] Inventor: Hiroshi Sogo, Moriyama, Japan

[73] Assignee: Asahi Kasei Kogyo Kabushiki Kaisha, Osaka, Japan

[21] Appl. No.: 347,186

[22] Filed: Nov. 21, 1994

Related U.S. Application Data

[63] Continuation of Ser. No. 949,845, filed as PCT/JP92/00834, Jul. 2, 1992, published as WO93/01623, Jan. 21, 1993, abandoned.

[30] Foreign Application Priority Data

Jul. 5, 1991 [JP] Japan ...................... 3-165866

[51] Int. Cl.$^6$ .............................. B32B 3/26; H01M 2/16; C25B 13/00
[52] U.S. Cl. .................. 428/315.7; 204/295; 204/296; 428/304.4; 428/321.1; 428/339; 429/129; 429/142; 429/145; 429/249; 429/254
[58] Field of Search ...................... 204/295, 296; 428/339, 321.1, 315.7, 304.4; 429/129, 142, 145, 249, 254

[56] References Cited

U.S. PATENT DOCUMENTS

| | | | |
|---|---|---|---|
| 4,335,193 | 6/1982 | Doi et al. | 429/354 |
| 4,731,304 | 3/1988 | Lundquist et al. | 429/145 |
| 4,863,792 | 9/1989 | Mrozinski | 428/315.7 |
| 5,238,735 | 8/1993 | Nagou et al. | 428/304.4 |
| 5,240,655 | 8/1993 | Troffkin et al. | 429/254 |

FOREIGN PATENT DOCUMENTS

| | | |
|---|---|---|
| 3617318 | 11/1987 | Germany. |
| 46-40119 | 11/1971 | Japan. |
| 64-70538 | 3/1989 | Japan. |
| 294356 | 4/1990 | Japan. |

OTHER PUBLICATIONS

Patent Abstract of Japan, vol. 16, No. 389 (E–1250) 19 Aug. 1992 & JP-A-41–26 352 (Nitto Denko).

Patent Abstract of Japan, vol. 14, No. 163 (E–910) (4106) 29 Mar. 1990 & JP-A-20 21 559 (Nitto Denko Corp.).

*Primary Examiner*—Marion E. McCamish
*Assistant Examiner*—Blaine R. Copenheaver
*Attorney, Agent, or Firm*—Birch, Stewart, Kolasch & Birch, LLP

[57] ABSTRACT

A separator for a battery using an organic electrolytic solution, which comprises a microporous film comprising a matrix comprised of a polyethylene and a propylene polymer having a weight average molecular weight of from 10,000 to 1,000,000, the propylene polymer being present in a proportion of from 5 to 45% by weight, based on the total weight of the polyethylene and the propylene polymer, the polyethylene containing a fraction having a molecular weight of not smaller than 1,000,000 in a proportion of at least 10% by weight and a fraction having a molecular weight of not greater than 100,000 in a proportion of at least 5% by weight, and wherein the microporous film has a thickness of from 10 to 500 μm, a porosity of from 40 to 85% and a maximum pore diameter of from 0.05 to 5 μm.

23 Claims, 4 Drawing Sheets

SEPARATOR FOR A BATTERY USING AN ORGANIC ELECTROLYTIC SOLUTION AND METHOD FOR PREPARING THE SAME

This application is a continuation of application Ser. No. 07/949,845, filed as PCT/JP92/00834, Jul. 2, 1992 published as WO93/01623, Jan. 21, 1993, now abandoned.

BACKGROUND OF THE INVENTION

1. Field of the Invention

The present invention relates to a separator for a battery using an organic electrolytic solution. More particularly, the present invention is concerned with a separator which comprises a mixture of a polyethylene and a propylene polymer and is of a uniform three-dimensional porous structure having fine pores and which exhibits excellent chemical resistance, mechanical properties and ion permeability. The separator of the present invention can advantageously be used in batteries, especially lithium batteries, such as spiral type primary and secondary lithium batteries (in which rapid advances have recently been made) or in other types of primary and secondary batteries using an organic electrolytic solution, especially while enjoying excellent safety. The present invention is also concerned with a method for producing the separator.

2. Description of the Related Art

Various types of microporous films of olefin polymers are known. For example, Japanese Patent Application Laid-Open Specification No. 2-94356 discloses a microporous film of polyethylene, but the film has poor mechanical properties. Japanese Patent Application Laid-Open Specification No. 64-70538 discloses a microporous film of a composition comprising an ultrahigh molecular weight polyethylene and a polypropylene. However, this composition requires a high temperature for extrusion and, therefore, when it is attempted to form a film from the composition by the use of an organic liquid (as a plasticizer which is to be extracted after the film formation for rendering the film porous), decomposition of the organic liquid is likely to occur, leading to difficulties in film formation. Further, Japanese Patent Application Publication Specification No. 46-40119 discloses a microporous film of a polypropylene, but the film has drawbacks in that it lacks a uniform three-dimensional porous structure and has a porosity as low as from only 30 to 40%, leading to a poor ion permeability. Moreover, the films described in the above-mentioned three patent documents have a disadvantage particularly with respect to safety, when these films are used as separators for lithium batteries, particularly for spiral type primary and secondary lithium batteries, in which rapid advances have recently been made or for other types of primary and secondary batteries using an organic electrolytic solution.

The terminology "safety" used in the present invention is explained below. When a battery undergoes external short-circuiting, Joule heat is generated by the short-circuiting, thereby causing the temperature of the battery to be elevated, so that a microporous film used as the battery separator is deformed or melted. The deformation of the porous film causes the pore diameter of the porous film to be reduced, thereby increasing the electrical resistance (corresponding to anti air permeability). The melting of the porous film causes the pores thereof to disappear thereby rendering the film poreless (the temperature at which the anti air permeability of the porous film becomes 500 sec/100 cc per sheet or more is referred to as the "pore-eliminating temperature"). The lower the temperature at which the electrical resistance of the microporous film is increased, or the pore-eliminating temperature of the microporous film, the lower the temperature at which the flow of ions is inhibited, thus preventing the internal temperature of the battery from being further increased. Therefore, when the temperature at which the electrical resistance of the microporous film is increased, or the pore-eliminating temperature of the microporous film is low, the internal temperature of the battery does not reach the melting point of lithium or the flash point of an organic electrolytic solution, so that the occurrence of accidents, such as fire, is prevented, thus assuring safety. More importantly once the internal temperature of a battery has risen, even when the electrical resistance of the separator has become increased, the once elevated internal temperature is not likely to sharply drop. It is even possible for the internal temperature to continue to rise. In the battery separator in which the pores have been eliminated by melting, the melt viscosity of the separator film is lowered with a further increase in the temperature, and when the temperature has reached a certain point, the separator suffers breakage. The higher the temperature at which the separator breaks (which is referred to as "film-breaking temperature" and at which the anti air permeability becomes substantially zero), the longer the period of time during which the flow of ions is inhibited, thereby surely preventing the temperature from rising. Thus, it can be considered that the higher the film-breaking temperature, the higher the safety. The present inventor has found that a specific characteristic of a separator, which has conventionally been not recognized, namely, the difference between the film-breaking temperature and the pore-eliminating temperature, is a decisive factor for assuring safety. Specifically, a battery separator in which the difference between the above-mentioned two characteristic temperatures is large can be considered to be a battery separator having high safety.

Illustratively stated, a separator comprised of a polyethylene (an ultrahigh molecular weight polyethylene, a high molecular weight polyethylene, or a mixture of an ultrahigh molecular weight polyethylene and a high molecular weight polyethylene) alone has a low pore-eliminating temperature, but also has a low film-breaking temperature, so that the safety of such a separator cannot be considered to be high.

On the other hand, a separator comprised of a propylene polymer alone has a high pore-eliminating temperature, so that the safety is low.

Conventionally, an ultrahigh molecular weight polyethylene has excellent mechanical properties, but has poor molding properties because of its low flowability. When a mixture of an ultrahigh molecular weight polyethylene, inorganic particles and an organic liquid, is subjected to extrusion molding for obtaining a microporous film which is improved in mechanical properties, a pressure increase occurs in the molding, thus causing difficulties in molding. Further, a mixture of an ultrahigh molecular weight polyethylene, a high molecular weight polyethylene, inorganic particles and an organic liquid can be conceived. In the extrusion molding of the mixture, however, when the ratio of the ultrahigh molecular weight polyethylene to the other components is increased, an increase in the molding pressure occurs, thereby causing difficulties in the molding. Consequently, in this case, it is impossible to enhance the mechanical properties by increasing the ratio of the ultrahigh molecular weight polyethylene.

SUMMARY OF THE INVENTION

In these situations, the present inventor made extensive and intensive studies to develop a separator for a battery, which is free from the above-mentioned drawbacks of the conventional separators for batteries using an organic electrolytic solution and is excellent in the safety. More specifically, the present inventor made an investigation of the use, as a material for producing a film, of a mixture of a polymer component comprising in combination, a polyethylene having a specific molecular weight distribution and a propylene polymer having a weight average molecular weight in a specific range, inorganic particles and an organic liquid. As a result, the present inventor found that when the above-mentioned mixture is used, the proportion of the ultrahigh molecular weight polyethylene fraction in the molecular weight distribution of the polyethylene can be increased without suffering from a pressure increase in the molding for film formation, so that it is possible to obtain a separator for a battery using an organic electrolytic solution, which has both excellent mechanical properties and excellent safety.

Accordingly, it is an object of the present invention to provide a separator for a battery, which can be obtained from a mixture of a polyethylene having a specific molecular weight distribution and a propylene polymer having a weight average molecular weight in a specific range and which has not only a uniform three-dimensional porous structure having fine pores, but also exhibits excellent chemical resistance, mechanical properties and ion permeability, so that it can advantageously be used in batteries, particularly lithium batteries, such as spiral type primary and secondary lithium batteries in which rapid advances have recently been made or in other types of primary and secondary batteries using an organic electrolytic solution, and is excellent in safety.

It is another object of the present invention to provide a method for producing the above-mentioned high safety separator for a battery using an organic electrolytic solution.

The foregoing and other objects, features and advantages of the present invention will be apparent from the following detailed description. However, it should be understood that the detailed description and specific examples, while indicating preferred embodiments of the invention, are given by way of illustration only, since various changes and modification within the spirit and scope of the invention will become apparent to those skilled in the art from this detailed description.

DETAILED DESCRIPTION OF THE INVENTION

DISCLOSURE OF THE INVENTION

Figure 1:
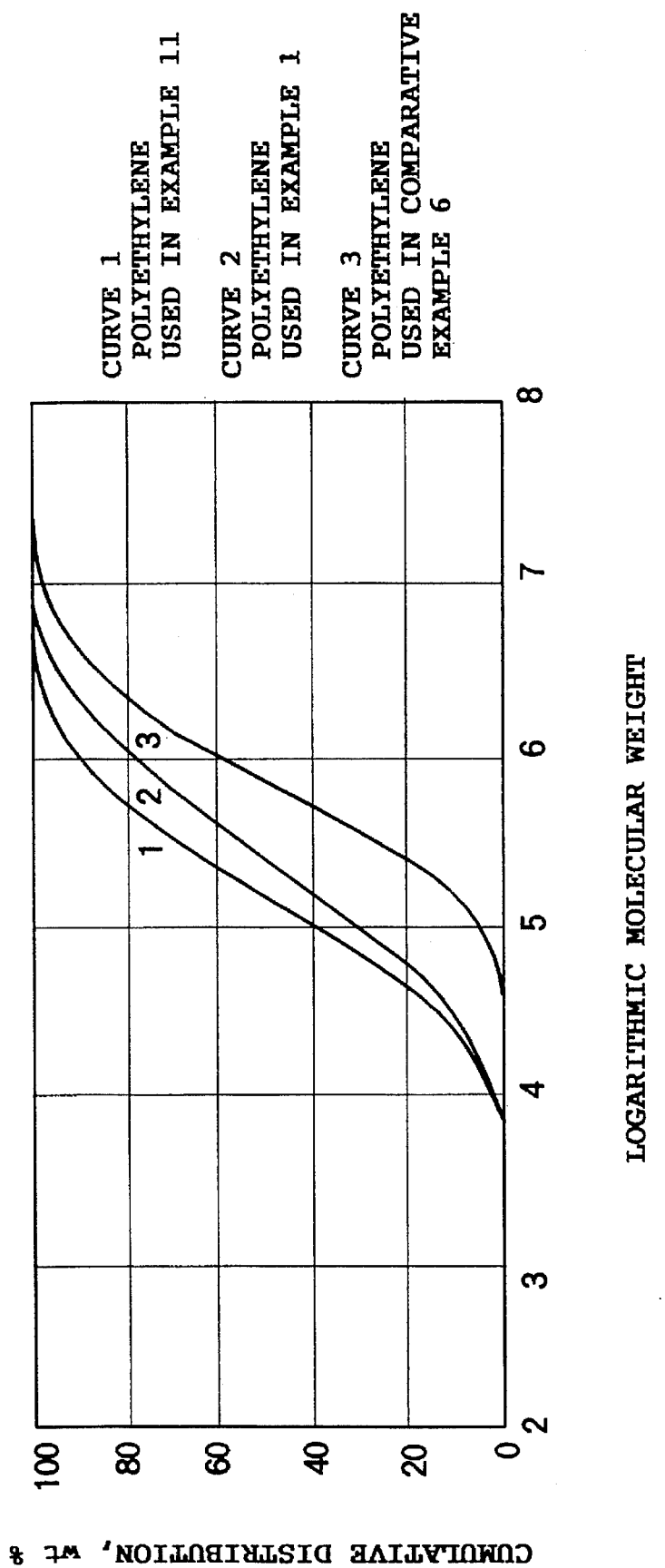
FIG. 1 illustrates molecular weight distributions (cummulative distribution vs. logarithmic molecular weight) of polyethylenes (a polyethylene mixture being used in Example 1) employed in Examples 1 and 11 and Comparative Example 6.

According to the present invention, there is provided a separator for a battery using an organic electrolytic solution, which comprises a microporous film comprising a matrix comprised of a polyethylene and a propylene polymer having a weight average molecular weight of from 10,000 to 1,000,000, the propylene polymer being present in a proportion of from 5 to 45% by weight, based on the total weight of the polyethylene and the propylene polymer, the polyethylene containing a fraction having a molecular weight of not smaller than 1,000,000 in a proportion of at least 10% by weight, based on the weight of the polyethylene, and a fraction having a molecular weight of not greater than 100,000 in a proportion of at least 5% by weight, based on the weight of the polyethylene, and wherein the microporous film has a thickness of from 10 to 500 µm, a porosity of from 40 to 85% and a maximum pore diameter of from 0.05 to 5 µm.

Further, according to the present invention, there is provided a method for producing a separator for a battery using an organic electrolytic solution, which comprises:

(a) blending a polyethylene, a propylene polymer having a weight average molecular weight of from 10,000 to 1,000,000, inorganic particles and an organic liquid, the propylene polymer being present in an amount of from 5 to 45% by weight, based on the total weight of the polyethylene and the propylene polymer, the polyethylene containing a fraction having a molecular weight of not smaller than 1,000,000 in a proportion of at least 10% by weight, based on the weight of the polyethylene, and a fraction having a molecular weight of not greater than 100,000 in a proportion of at least 5% by weight, based on the weight of the polyethylene, (b) subjecting the resultant blend to extrusion molding to form a film, and (c) extracting the organic liquid and the inorganic particles from the film.

As mentioned above, the matrix of the microporous film constituting the separator of the present invention is comprised of a polyethylene having a specific molecular weight distribution and a propylene polymer having a specific weight average molecular weight.

The polyethylene to be used in the present invention contains a fraction having a molecular weight of not smaller than 1,000,000 in a proportion of at least 10% by weight, based on the weight of the polyethylene, and a fraction having a molecular weight of not 10 greater than 100,000 in a proportion of at least 5% by weight, based on the weight of the polyethylene. It is preferred that the polyethylene contain a fraction having a molecular weight of not smaller than 1,000,000 in a proportion of at least 15 % by weight, based on the weight of the polyethylene, and a fraction having a molecular weight of not greater than 100,000 in a proportion of at least 10% by weight, based on the weight of the polyethylene.

The polyethylene usable in the present invention may be any of a low-pressure polyethylene, a medium-pressure polyethylene and a high-pressure polyethylene. Preferred is a low-pressure polyethylene. Further, a mixture of two or more types of polyethylene can be used, as long as the mixture satisfies the requirement that the mixture contain a fraction having a molecular weight of not smaller than 1,000,000 in a proportion of at least 10% by weight, based on the weight of the mixture, and a fraction having a molecular weight of not greater than 100,000 in a proportion of at least 5% by weight, based on the weight of the mixture.

In the present invention, it is requisite that the propylene polymer have a weight average molecular weight of from 10,000 to 1,000,000. The weight average molecular weight of the propylene polymer is preferably from 50,000 to 800,000, more preferably from 80,000 to 600,000.

Examples of propylene polymers employable in the present invention include a homopolymer of propylene, a copolymer of propylene with ethylene, and a mixture of these polymers.

When the proportion of the fraction having a molecular weight of not smaller than 1,000,000 in the polyethylene is less than 10% by weight, the microporous film cannot be used as a separator for a battery because of its poor mechanical properties. On the other hand, when this fraction is present in a proportion of more than 80 % by weight, the polyethylene has poor flowability, so that extrusion molding becomes difficult.

Further, when the proportion of the fraction having a molecular weight of not greater than 100,000 in the polyethylene is less than 5% by weight, the pore-eliminating temperature becomes higher, thus impairing the safety of a separator. On the other hand, when this fraction is present in a proportion of more than 60% by weight, the microporous film has poor mechanical properties, so that the use of the microporous film as a battery separator becomes difficult.

In the matrix of the microporous film constituting the separator of the present invention, the proportion of a propylene polymer having a weight average molecular weight of from 10,000 to 1,000,000 is from 5 to 45% by weight, preferably 7 to 35% by weight, based on the total weight of the polyethylene and the propylene polymer. When the proportion of the propylene polymer is less than 5% by weight, the film-breaking temperature, which influences the safety, becomes lower, thus causing the separator to have poor safety. When the proportion of the propylene polymer exceeds 45% by weight, not only does the pore-eliminating temperature, which influences the safety, become higher, but also it becomes difficult to form a uniform film, lowering the mechanical strength of the film.

The matrix of the microporous film constituting the separator of the present invention may further comprise an olefin polymer other than the polyethylene having the above-mentioned molecular weight distribution and the propylene polymer having a weight average molecular weight in the above-mentioned range, in a proportion of not greater than 30% by weight, preferably not greater than 20% by weight, based on the weight of the matrix including the olefin polymer. Examples of such olefin polymers include a homopolymer or copolymer of an olefin, such as ethylene, propylene, butene-1, methylbutene, methylpentene and the like.

The porous film constituting the separator of the present invention has a thickness of from 10 to 500 µm, preferably from 20 to 200 µm, a porosity of from 40 to 85%, preferably from 45 to 70% and a maximum pore diameter of from 0.05 to 5 µm, preferably from 0.1 to 2 µm.

When the thickness of the microporous film is less than 10 µm, the film is too thin to have high mechanical properties. On the other hand, when the thickness is more than 500 µm, the film is too thick to have good ion permeability. When the porosity is less than 40%, the film is poor in ion permeability. On the other hand, when the porosity is more than 85%, the film is poor in mechanical properties. When the maximum pore diameter is less than 0.05 µm, the pore diameter is too small for the film to possess good ion permeability. When the maximum pore diameter is more than 5 µm, the film is low in mechanical properties.

As mentioned above, the battery separator of the present invention can be produced by (a) blending a polyethylene, a propylene polymer having a weight average molecular weight of from 10,000 to 1,000,000, inorganic particles and an organic liquid, the propylene polymer being present in an amount of from 5 to 45% by weight, based on the total weight of the polyethylene and the propylene polymer, the polyethylene containing a fraction having a molecular weight of not smaller than 1,000,000 in a proportion of at least 10% by weight, based on the weight of the polyethylene, and a fraction having a molecular weight of not greater than 100,000 in a proportion of at least 5% by weight, based on the weight of the polyethylene; (b) subjecting the resultant blend to extrusion molding to form a film; and (c) extracting the organic liquid and the inorganic particles from the film.

As the polyethylene and propylene polymer to be used in the method of the present invention for producing a separator for a battery, those which are mentioned above can be employed. If desired, the above-mentioned olefin polymers other than the specific polyethylene and propylene polymer as essential component polymers may also be additionally used.

As examples of inorganic particles, there can be mentioned silica, mica, talc, titanium oxide, aluminum oxide, barium sulfate, synthetic zeolite and the like, with silica being preferred. It is preferred that the inorganic particles have an average particle size of from 0.005 to 0.5 µm.

The organic liquid to be used in the present invention has a solubility parameter (SP) of from 7.7 to 10.0. The solubility parameter is a parameter which is used to assess the solubility of a polymer in a solvent (H. Burrell and B. Immerrut in "Polymer Handbook", 1966, Part IV, page 34). Illustrative examples of organic liquids include phthalic acid esters, such as diethyl phthalate, dibutyl phthalate and dioctyl phthalate; sebacic acid esters, such as dioctyl sebacate; adipic acid esters, such as dioctyl adipate; trimellitic acid esters, such as trioctyl trimellitate; phosphoric acid esters, such as tributyl phosphate, octyl diphenyl phosphate; liquid paraffin; and the like, or a mixture thereof. Of these organic liquids, dibutyl phthalate, dioctyl phthalate, liquid paraffin and a mixture thereof are especially preferred.

An illustrative explanation will now be given as to the method of the present invention for producing a separator for a battery.

In step (a) of the method of the present invention, a polyethylene (containing a fraction having a molecular weight of not smaller than 1,000,000 in a proportion of at least 10% by weight, based on the weight of the polyethylene, and a fraction having a molecular weight of not greater than 100,000 in a proportion of at least 5% by weight, based on the weight of the polyethylene); a propylene polymer having a weight average molecular weight of from 10,000 to 1,000,000 (the propylene polymer being present in an amount of from 5 to 45% by weight, based on the total weight of the polyethylene and the propylene polymer); an organic liquid; and inorganic particles are blended in proportions such that the sum of the polyethylene and the propylene polymer is from 10 to 60% by weight, preferably 12 to 50% by weight, the amount of the inorganic particles is from 10 to 50% by weight, preferably 15 to 35% by weight, and the amount of the organic liquid is from 30 to 75% by weight, preferably 40 to 65% by weight, each being based on the total weight of all of the above components.

When the sum of the polyethylene and the propylene polymer is less than 10% by weight, poor mechanical properties and poor moldability would be caused. On the other hand, when the sum is more than 60% by weight, the microporous film produced from the resultant blend would be characterized with unfavorably low porosity and poor permeability. When the amount of the inorganic particles is less than 10% by weight, the resultant blend would not assume a powdery or granular form, would thus lead to difficulties in placing the blend into an extrusion molding machine. On the other hand, when the amount of the inorganic particles is more than 50% by weight, not only can the desired flowability of the resultant blend not be obtainable at the time of extrusion molding, but also the molded product formed would be brittle and cannot be put to practical use. When the amount of the organic liquid is less than 30% by weight, the contribution of the organic liquid toward the formation of pores is lowered, so that a microporous film having high porosity and high ion permeability cannot be obtained. On the other hand, when the amount of the organic liquid is more than 75% by weight, difficulties in molding are caused and the resultant molded product is inevitably poor in mechanical properties.

In step (a) of the method of the present invention, essentially, the four components, i.e., a polyethylene, a propylene polymer, inorganic particles and an organic liquid are blended. As mentioned above, however, in addition to the polyethylene having the above-mentioned specific molecular weight distribution and the propylene polymer having the above-mentioned specific weight average molecular weight, an olefin polymer other than the above-mentioned polyethylene and the above-mentioned propylene polymer can be added. With respect to the types and amounts of these optionally employable olefin polymers, an explanation is made in connection with the matrix of the microporous film constituting the separator of the present invention.

Further, if desired, a lubricant, an antioxidant, a UV light absorber, a plasticizer, or an auxiliary agent for molding can be added, as long as the effect of the present invention is not substantially impaired.

Blending of the above-mentioned components can be conducted by a conventional blending method, using an ordinary mixer or blender, such as a supermixer, a ribbon blender and a V-blender.

The blend obtained in step (a) can be kneaded by means of a conventional melt-kneading machine, such as an extruder, a Banbury mixer, a twin roll and a kneader. As the melt-molding method usable in step (b) of the method of the present invention, there can be mentioned methods, such as a T-die method, inflation method, hollow die extrusion molding, and the like. Alternatively, the molding of the blend can be conducted simply by means of an apparatus capable of kneading and extruding, such as an extruder and a kneading-extruder.

In this way, in step (b) of the method of the present invention, a film having a thickness of 10 to 500 μm is obtained.

In step (c), the organic liquid and the inorganic particles are extracted from the film obtained in step (b). It is preferred that the organic liquid be first extracted and, subsequently, the inorganic particles be extracted.

The extraction of the organic liquid from the film is conducted using a solvent for the organic liquid. The solvent usable for the extraction is selected from those which are capable of dissolving the organic liquid but have substantially no capability of dissolving the polymer component comprised of a polyethylene and a propylene polymer (optionally plus other olefin polymers) which constitute the matrix of the final porous film. Examples of solvents for extracting the organic liquid include methanol, acetone, and halogenated hydrocarbon such as 1,1,1-trichloroethane. Of these solvents, especially preferred is a halogenated hydrocarbon. The extraction of the organic liquid can be easily conducted according to a customary method, such as a batch method and a counter-flow multiple-stage method. A semi-extracted microporous film from which the organic liquid has been extracted can, if desired, be subjected to treatment for removal of the solvent by drying.

Subsequently, the extraction of the inorganic particles is conducted by the use of a solvent for the inorganic particles. The extraction of the inorganic particles can be easily conducted according to a customary method, such as a batch method and a counter-flow multiple-stage method and the like. As a solvent for the extraction, an aqueous alkali solution, such as sodium hydroxide, and potassium hydroxide is preferably used. There is no limitation with respect to the solvents for the inorganic particles, as long as they are capable of dissolving the inorganic particles but have substantially no capability of dissolving the polymer component comprised of a polyethylene and a propylene polymer (optionally plus other olefin polymers) which constitute the matrix of the final porous film.

For changing the pore diameter or porosity of the microporous film, or for improving the strength of the microporous film, a microporous film material obtained by extracting at least one of the organic liquid and the inorganic particles may be subjected to monoaxial or biaxial orientation.

After the extraction of the organic liquid and the inorganic particles, the resultant microporous film may still contain some organic liquid and inorganic particles, which is acceptable, as long as the remaining materials do not impair the desired properties of the microporous film. The acceptable residual amount of the organic liquid in the microporous film is 3% by weight or less, preferably 2% by weight or less, based on the weight of the microporous film. The acceptable residual amount of the inorganic particles in the microporous film is 3% by weight or less, preferably 2% by weight or less, based on the weight of the microporous film.

In another aspect of the present invention, there is provided a method for producing a separator for a battery using an organic electrolytic solution, which comprises extracting the inorganic particles from a microporous film comprising a polyethylene, a propylene polymer having a weight average molecular weight of from 10,000 to 1,000,000, and inorganic particles, the propylene polymer being present in a proportion of from 5 to 45% by weight, based on the total weight of the polyethylene and the propylene polymer, the polyethylene containing a fraction having a molecular weight of not smaller than 1,000,000 in a proportion of at least 10% by weight, based on the weight of the polyethylene, and a fraction having a molecular weight of not greater than 100,000 in a proportion of at least 5% by weight, based on the weight of the polyethylene.

As mentioned above, when a separator comprising a matrix comprised of a conventional polymer, such as an ultrahigh molecular weight polyethylene, a high molecular weight polyethylene, a polypropylene, a mixture of a conventional ultrahigh molecular weight polyethylene with a polypropylene and a mixture of a conventional ultrahigh molecular weight polyethylene with a high molecular weight polyethylene, is used in lithium batteries, particularly spiral type primary and secondary lithium batteries, in which rapid advances recently have show have made, or in other types of primary and secondary batteries using an organic electrolytic solution, problems arise with respect to the safety. Further, a separator comprised of a matrix comprising an ultrahigh molecular weight polyethylene, a high molecular weight polyethylene or a mixture of an ultrahigh molecular weight polyethylene with a high molecular weight polyethylene, has disadvantages in that it is likely to melt at the melting temperature of a polyethylene, i.e., 135° to 140° C., and to have its pores eliminated, and when the temperature is further increased, the separator would incur breakage at about 150° C. On the other hand, a separator comprised of a polypropylene has a high pore-eliminating temperature, because the melting temperature of the polypropylene is as high as 165° C., and when the temperature of this separator is further increased, the separator breaks at about 170° C. Further, with respect to a porous film comprised of a mixture of a conventional ultrahigh molecular weight polyethylene and a polypropylene, the pore-eliminating temperature is about 155° C., which is close to the melting temperature of the polypropylene, and the film incurs breakage at about 170° C. and, therefore, the difference between the film-breaking temperature and the pore-eliminating temperature is small. In contrast, the battery separator of the present invention, which comprises a porous film comprising a matrix comprised of a polyethylene having a specific molecular weight distribution and a propylene polymer having a specific weight average molecular weight as essential component polymers, has a very high safety as compared to the conventional battery separators. This is because in the separator film of the present invention, the pore-eliminating temperature at which the film melts to eliminate its pores is from 135° to 140° C., and the film-breaking temperature at which breakage of the film occurs is about 170° C and, therefore, the difference between the film-breaking temperature and the pore-eliminating temperature is as large as 30° to 35° C.

The battery separator of the present invention has especially excellent properties described below.

When the separator of the present invention, which is held at 25° C. in a clamping-secured state, is subjected to heat treatment, the anti air permeability of the separator is increased, so that the separator which has been heat-treated at a temperature of 135° C. or higher has an anti air permeability of at least two times that at 25° C. Further, the separator of the present invention has a difference of at least 20° C. between the film-breaking temperature and the pore-eliminating temperature. The respective methods for determining the film-breaking temperature and the pore-eliminating temperature, will be described below under the item of "Safety Test".

The above mentioned properties are very advantageous from the viewpoint of assuring safety, particularly when the separator of the present invention is employed as a separator for a lithium battery. The separator of the present invention is most suitable as a separator for a lithium battery.

As described above, the separator of the present invention has a uniform three-dimensional porous structure having fine pores and exhibits not only excellent safety but also excellent chemical resistance, excellent mechanical properties and high porosity and high permeability. The separator of the present invention can be very advantageously used not only in a lithium battery, particularly spiral type primary and secondary lithium batteries, which recently show a rapid progress, but also in other primary and secondary batteries using an organic electrolytic solution.

The present invention will now be described in greater detail with reference to the Examples that by no means limit the scope of the present invention. The properties of the separator of the present invention were evaluated by the following methods.

1. Film thickness: Measured by means of a dial gauge (the minimum scale: 1 µm)

2. Maximum pore diameter: Calculated from a bubble point value determined in ethanol, according to ASTM E-128-61

3. Porosity:

$$\text{Porosity} = \left\{ 1 - \frac{100 \cdot X}{Y \cdot Z} \right\} \times 100 [\%]$$

X: Weight of the film [g/dm$^2$]
Y: Specific gravity of the polymer
Z: Thickness of the film [µm]

4. Air permeability: Measured in accordance with JIS-P-8117, wherein the measurement was conducted at 25° C.

5. Molecular weight: Determined by GPC method.

A 0.05% 1,2,4-trichlorobenzene solution of a polyethylene, a propylene polymer or a mixture thereof was subjected to measurement at 140° C. using 150 C-GPC (manufactured and sold by Waters Associates Co., U.S.A.) under conditions that Shodex GPC AT-807/S column and Tosoh TSK-GEL GMH6-HT column arranged in tandem were used and the injection amount was 500 µl.

The calibration of the molecular weight was conducted by the use of a standard sample of polystyrene. The respective molecular weights of a polyethylene and a propylene polymer in a mixture thereof can be determined by separating the absorptions of the polyethylene and the propylene polymer by means of Fourier transform infrared spectrophotometer (FI-IR)1760-X manufactured by PERKIN ELMER, U.S.A, having connected thereto a GPC apparatus. The proportion of a fraction having a specific molecular weight was determined from the integral curve of a GPC chart. The weight average molecular weight was determined by GPC.

With respect to an ultrahigh molecular weight polyethylene, the value of a viscosity average molecular weight was indicated. As shown in Comparative Examples 2 and 6, a polyethylene having a viscosity average molecular weight of 3,000,000 had a weight average molecular weight of 1,400,000 as measured by GPC. The relationship between the viscosity average and weight average molecular weights varies according to the mode of the molecular weight distribution. It is requisite that the separator of the present invention have a specific distribution in the molecular weight of the polyethylene.

6. The amount of propylene polymer:

The proportions of a polyethylene and a propylene polymer were determined by FI-IR after the separator had been changed to a poreless film.

7. The viscosity average molecular weight of polyethylene: Calculated from a viscosity [η] measured at a temperature of 135° C. in a solvent (decalin), in accordance with the following formula:

$$[\eta] = 6.2 \times 10^{-4} Mv^{0.7} \text{(Chiang's formula)}.$$

8. The viscosity average molecular weight of propylene polymer: Calculated from a viscosity [η] measured at a temperature of 135° C. in a solvent (tetralin), in accordance with the following formula:

$$[\eta] = 0.80 \times 10^{-4} Mv^{0.8} \text{(Parrini's formula)}.$$

9. Safety Test: A Teflon sheet having a size of 100 mm×100 mm (thickness : 2 mm) was cut out at its inner portion to provide an opening of 80 mm×80 mm, thus preparing a frame structure. A sample to be tested was secured to the frame structure in its opening by means of clippers along the entire periphery of the sample. The sample was allowed to stand for 30 minutes in a Geer oven set at a predetermined temperature and then, the sample was taken out of the oven and air-cooled down to 25° C. After completion of the air-cooling, the clippers were removed, and the air permeability of the microporous film was measured in an atmosphere at 25° C. The Geer oven temperature at which the air permeability exceeded 500 sec/100 cc per sheet was taken as the pore-eliminating temperature. The Geer oven temperature at which a break of the film was observed was taken as the film-breaking temperature.

EXAMPLE 1

13% by volume (23.2% by weight) of powdery silica and 60% by volume (53.6% by weight) of dioctyl phthalate were mixed together in a supermixer to obtain a mixture. To the thus obtained mixture were added a polyethylene mixture composed of 9% by volume (7.8% by weight) of an ultrahigh molecular weight polyethylene having a viscosity average molecular weight of 3,000,000 and 9% by volume (7.8% by weight) of a polyethylene having a weight average molecular weight of 200,000 and 9% by volume (7.4% by weight) of a polypropylene having a viscosity average molecular weight of 400,000, and blended in the supermixer. The resultant blend was molded into a film having a thickness of 100 μm by means of a film molding machine comprised of a 30 mm twin screw extruder and, attached thereto, a T-die having a width of 450 mm. The molded film was immersed in 1,1,1-trichloroethane for 5 minutes to extract dioctyl phthalate therefrom, followed by drying. The dried film was further immersed in 20% by weight aqueous caustic soda at 80° C. for 30 minutes to extract the powdery silica therefrom, followed by washing with water and drying. The characteristics of the resultant film are shown in Table 1.

The GPC measurement of the polyethylene mixture employed showed that the polyethylene mixture had the following molecular weight distribution:

| molecular weight | weight proportion |
|---|---|
| 1,000,000 or more | 22% by weight, |
| 500,000 or more | 36% by weight, |
| 300,000 or less | 54% by weight, and |
| 100,000 or less | 31% by weight. |

The molecular weight distribution of the polyethylene mixture is illustrated in FIG. 1.

Further, the GPC measurement of the polypropylene employed showed that the propylene had a weight average molecular weight of 510,000, and had the following molecular weight distribution:

| molecular weight | weight proportion |
|---|---|
| 1,000,000 or more | 12% by weight, |
| 500,000 or more | 27% by weight, |
| 300,000 or less | 44% by weight, and |
| 100,000 or less | 23% by weight. |

Figure 2:
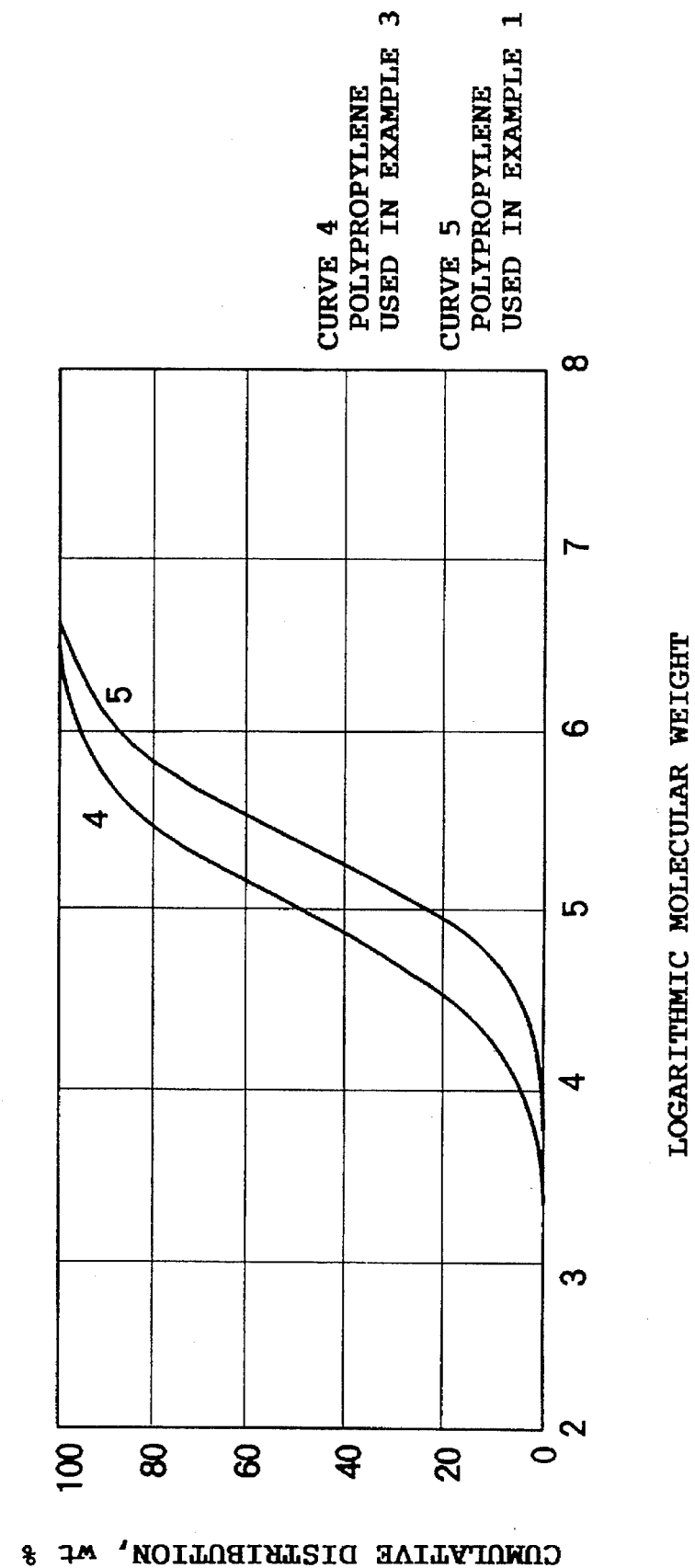
FIG. 2 illustrates molecular weight distributions (cummalative distribution vs. logarithmic molecular weight) of polypropylenes employed in Examples 1 and 3.

The molecular weight distribution of the polypropylene is illustrated in FIG. 2.

EXAMPLE 2

The film obtained in Example 1 was longitudinally drawn by means of a roll drawing machine heated at 120° C. to a length three times the original length, followed by heat treatment at 125° C. for 5 seconds. The characteristics of the resultant film are shown in Table 1.

The film was subjected to wide angle X-ray diffractometry at room temperature.

The orientation degrees of polyethylene and polypropylene were evaluated from (110) of the former and (110) of the latter to find that the respective orientation degrees were equally 92%.

Next, the film was subjected to high temperature, wide angle X-ray diffractometry.

In the photograph of the film taken at 140° C., copresence of an amorphous halo and a diffraction of oriented crystals was observed in polyethylene (100).

Further, it was observed that the orientation degree of polypropylene (110) was lowered at this temperature.

At 145° C., an amorphous halo of polyethylene and an unoriented diffraction pattern of polypropylene were observed in the photograph.

From the above results, it was found that at room temperature, the polyethylene and the polypropylene were uniaxially oriented along the drawing direction. On the other hand, at 140° C., oriented crystals of the polyethylene still remained with the polyethylene being partially fused, and crystals of the polypropylene were present with the orientation degree thereof being lowered.

At 145° C., the crystals of the polypropylene were found to have no orientation. From the above, it is presumed that the polypropylene is finely dispersed in the polyethylene as a main material to form an islands-in-sea structure.

EXAMPLE 3

Substantially the same procedure as in Example 1 was carried out, except that 13% by volume (23.2% by weight) of powdery silica and 60% by volume (53.6% by weight) of dioctyl phthalate were mixed together in a supermixer to obtain a mixture, and that a polyethylene mixture comprised of 9% by volume (7.8% by weight) of an ultrahigh molecular weight polyethylene having a viscosity average molecular weight of about 1,000,000 and 9% by volume (7.8% by weight) of a polyethylene having a weight average molecular weight of 100,000 and 9% by volume (7.4% by weight) of a polypropylene having a viscosity average molecular weight of about 160,000 were added to the above obtained mixture, to thereby obtain a microporous film. The thus obtained film was longitudinally drawn by means of a roll drawing machine heated at 120° C. to a length three times the original length, followed by heat treatment at 125° C. for 5 seconds. The characteristics of the resultant film are shown in Table 1.

The GPC measurement of the polyethylene mixture employed showed that the polyethylene mixture had the following molecular weight distribution:

| molecular weight | weight proportion |
|---|---|
| 1,000,000 or more | 14% by weight, |
| 500,000 or more | 25% by weight, |
| 300,000 or less | 66% by weight, and |
| 100,000 or less | 45% by weight. |

Further, the GPC measurement of the polypropylene employed showed that the polypropylene had a weight average molecular weight of 240,000, and had the following molecular weight distribution:

| molecular weight | weight proportion |
| --- | --- |
| 1,000,000 or more | 5% by weight, |
| 500,000 or more | 12% by weight, |
| 300,000 or less | 70% by weight, and |
| 100,000 or less | 51% by weight. |

The molecular weight distribution of the polypropylene is illustrated in FIG. 2.

Figure 3:
FIG. 3 is a transmission electron micrograph (TEM) of the separator film obtained in Example 3.
Figure 4:
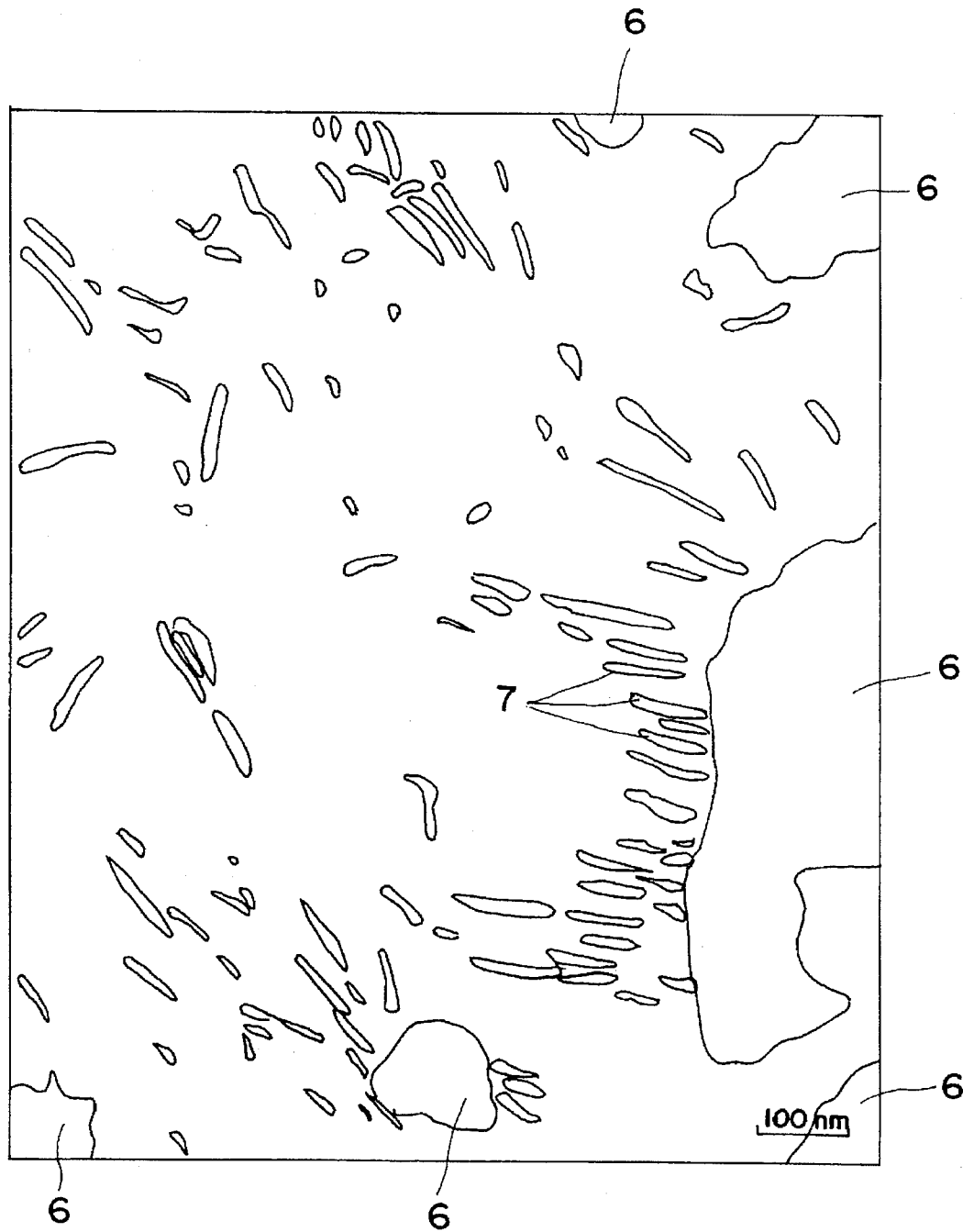
FIG. 4 is an illustration of the electron micrograph of FIG. 3.

Next, the film was observed by means of a transmission electron microscope (TEM). A sample of the film was subjected to ruthenium tetroxide vapor staining (1% aqueous solution), followed by embedding in a methacrylic resin (curing conditions: at 60° C. for 24 hours). From the embedded sample, an ultrathin section of about from 60 to 80 nm was prepared by means of an ultramicrotome. Subsequently, the thus prepared section was placed on a microscope grid covered with a carbon film and then, the embedding resin was dissolved with chloroform, followed by coating of the carbon to a thickness of about 6 nm, thereby obtaining a microsection. HITACHI H-500 was employed as a transmission electron microscope, and an observation was made at an accelerating voltage of 100 kV to obtain a photomicrograph. The thus obtained photomicrograph is shown in FIG. 3. An illustration of FIG. 3 is shown in FIG. 4. In FIG. 4, numeral 6 indicates a void and numeral 7 indicates a crystal grain. In the photomicrograph of FIG. 3, amorphous portions are stained to assume a black color. In FIGS. 3 and 4, it is not clear whether rod-shaped structures are comprised of polyethylene or polypropylene, but they appear to be crystal grains (major axis: about 100 nm, minor axis: about 15 nm). Domains as large as 150 nm or more could not be identified, thus showing that polyethylene and polypropylene were mixed in an extremely fine manner. As mentioned above, white portions (portions indicated by numeral 6 in FIG. 4) having no fine structures in FIGS. 3 and 4 are voids.

EXAMPLE 4

Substantially the same procedure as in Example 1 was carried out, except that 13% by volume (23.1% by weight) of powdery silica and 60% by volume (53.6% by weight) of dioctyl phthalate were mixed together in a supermixer to obtain a mixture and that a polyethylene mixture comprised of 12% by volume (10.4% by weight) of the same ultrahigh molecular weight polyethylene having a viscosity average molecular weight of 3,000,000 as employed in Example 1 and 12% by volume (10.4% by weight) of the same polyethylene having a weight average molecular weight of 200,000 as employed in Example 1 and 3% by volume (2.5% by weight) of a polypropylene having a viscosity average molecular weight of 400,000 were added to the above obtained mixture, to thereby obtain a microporous film. The thus obtained film was longitudinally drawn by means of a roll drawing machine heated at 120° C. to a length three times the original length, followed by heat treatment at 125° C. for 5 seconds. The characteristics of the resultant film are shown in Table 1.

EXAMPLE 5

Substantially the same procedure as in Example 1 was carried out, except that 12% by volume (21.5% by weight) of powdery silica and 62% by volume (58.9% by weight) of dioctyl phthalate were mixed together in a supermixer to obtain a mixture, and that a mixture comprised of 16% by volume (14% by weight) of an ultrahigh molecular weight polyethylene having a viscosity average molecular weight of 1,000,000 and 5% by volume (4.4% by weight) of a polyethylene having a weight average molecular weight of 100,000 and 5% by volume (4.1% by weight) of polypropylene having a viscosity average molecular weight of 160,000 were added to the above obtained mixture, to thereby obtain a microporous film. The thus obtained film was longitudinally drawn by means of a roll drawing machine heated at 120° C. to a length three times the original length, followed by heat treatment at 125° C. for 5 seconds. The characteristics of the resultant film are shown in Table 1.

The GPC measurement of the polyethylene mixture employed showed that the polyethylene had the following molecular weight distribution:

| molecular weight | weight proportion |
| --- | --- |
| 1,000,000 or more | 21% by weight, |
| 500,000 or more | 37% by weight, |
| 300,000 or less | 51% by weight, and |
| 100,000 or less | 28% by weight. |

The GPC measurement of the polypropylene showed the same results as those obtained in Example 3.

EXAMPLE 6

Substantially the same procedure as in Example 1 was carried out, except that 13% by volume (25.3% by weight) of powdery silica and 60% by volume (54.1% by weight) of dioctyl phthalate were mixed together in a supermixer to obtain a mixture, and that a polyethylene mixture comprised of 14% by volume (12.3% by weight) of an ultrahigh molecular weight polyethylene having a viscosity average molecular weight of 3,000,000, 2% by volume (1.8% by weight) of an ultrahigh molecular weight polyethylene having a viscosity average molecular weight of 1,000,000 and 5% by volume (4.4% by weight) of a polyethylene having a weight average molecular weight of 100,000, and 5% by volume (4.1% by weight) of a polypropylene having a viscosity average molecular weight of 160,000 were added to the above obtained mixture, to thereby obtain a microporous film. The thus obtained film was longitudinally drawn by means of a roll drawing machine heated at 120° C. to a length three times the original length, followed by heat treatment at 125° C. for 5 seconds. The characteristics of the resultant film are shown in Table 1.

The GPC measurement of the polyethylene mixture employed showed that the polyethylene mixture had the following molecular weight distribution:

| molecular weight | weight proportion |
| --- | --- |
| 1,000,000 or more | 30% by weight, |
| 500,000 or more | 47% by weight, |
| 300,000 or less | 42% by weight, and |
| 100,000 or less | 23% by weight. |

The GPC measurement of the polypropylene showed the same results as those obtained in Example 3.

EXAMPLE 7

13% by volume (23.2% by weight) of powdery silica and 60% by volume (53.6% by weight) of dioctyl phthalate were mixed together in a supermixer to obtain a mixture. To the thus obtained mixture were added a polyethylene mixture comprised of 9% by volume (7.8% by weight) of an ultra-high molecular weight polyethylene having a viscosity average molecular weight of 3,000,000 and 9% by volume (7.8% by weight) of a polyethylene having a weight average molecular weight of 200,000 and 9% by volume (7.4% by weight) of a polypropylene having a viscosity average molecular weight of 400,000, and blended in the supermixer. The resultant blend was molded into a film having a thickness of 200 μm by means of a film molding machine comprised of a 30 mm twin screw extruder and, attached thereto, a T-die having a width of 450 mm. The molded film was immersed in 1,1,1-trichloroethane for 5 minutes to extract dioctyl phthalate therefrom, followed by drying. The dried film was further immersed in 20% by weight aqueous caustic soda at 80° C. for 30 minutes, followed by washing with water and drying. The resultant microporous film was longitudinally drawn by means of a roll drawing machine heated at 120° C. to a length 3 times the original length. Subsequently, the drawn film was subjected to heat treatment at 125° C. for 5 seconds. The heat treated film was laterally drawn by means of a tenter drawing machine heated at 120° C. to a width two times the original width.

The characteristics of the resultant film are shown in Table 1.

The measurement of the polyethylene mixture and polypropylene empoloyed showed the same results as those obtained in Example 1.

EXAMPLE 8

20% by weight of powdery silica and 56% by weight of dioctyl phthalate were mixed together in a supermixer to obtain a mixture. To the obtained mixture were added 21.6% by weight of a single high density polyethylene having a weight average molecular weight of 650,000 measured by GPC and 2.4% by weight of a polypropylene having a weight average molecular weight of 510,000 measured by GPC, and blended in the supermixer. The resultant blend was subjected to substantially the same treatment as in Example 1 to thereby obtain a microporous film. The thus obtained microporous film was longitudinally drawn by means of a roll drawing machine heated at 120° C. to a length three times the original length, followed by heat treatment at 125° C. for 5 seconds to obtain a separator. The characteristics of the thus obtained separator are shown in Table 1.

The GPC measurement of the polyethylene employed showed that the polyethylene had the following molecular weight distribution:

| molecular weight | weight proportion |
| --- | --- |
| 1,000,000 or more | 20% by weight, |
| 500,000 or more | 33% by weight, |
| 300,000 or less | 55% by weight, and |
| 100,000 or less | 30% by weight. |

The GPC measurement of the polypropylene showed the same results as those obtained in Example 1.

EXAMPLE 9

A separator was obtained in substantially the same manner as described in Example 8, except that the high density polyethylene was employed in an amount of 22.8% by weight and the polypropylene was employed in an amount of 1.2% by weight. The characteristics of the resultant separator are shown in Table 1.

EXAMPLE 10

A separator was produced in substantially the same manner as in Example 8, except that a single polyethylene having a weight average molecular weight of 1,100,000 measured by GPC was employed. The characteristics of the thus produced separator are shown in Table 1.

The GPC measurement of the polyethylene employed showed that the polyethylene had the following molecular weight distribution:

| molecular weight | weight proportion |
| --- | --- |
| 1,000,000 or more | 30% by weight, |
| 500,000 or more | 50% by weight, |
| 300,000 or less | 30% by weight, and |
| 100,000 or less | 6% by weight. |

EXAMPLE 11

A separator was produced in substantially the same manner as in Example 8, except that a single polyethylene having a weight average molecular weight of 490,000 measured by GPC was employed. The characteristics of the thus obtained separator are shown in Table 1.

The GPC measurement of the polyethylene employed showed that the polyethylene had the following molecular weight distribution:

| molecular weight | weight proportion |
| --- | --- |
| 1,000,000 or more | 10% by weight, |
| 500,000 or more | 21% by weight, |
| 300,000 or less | 70% by weight, and |
| 100,000 or less | 40% by weight. |

The molecular weight distribution of this polyethylene is illustrated in FIG. 1.

Comparative Example 1

A microporous film was obtained in substantially the same manner as in Example 1, except that 13% by volume (23.1% by weight) of powdery silica and 60% by volume (53.6% by weight) of dioctyl phthalate were mixed together in a supermixer to obtain a mixture and a polyethylene mixture comprised of 13.5% by volume (11.7% by weight) of an ultrahigh molecular weight polyethylene having a viscosity average molecular weight of 3,000,000 and 13.5% by volume (11.7% by weight) of a polyethylene having a weight average molecular weight of 200,000 was added to the above obtained mixture and no polypropylene was used. The thus obtained microporous film was longitudinally drawn by means of a roll drawing machine heated at 120° C. to a length three times the original length, followed by heat treatment at 125° C. for 5 seconds. The characteristics of the thus obtained microporous film are shown in Table 2. The GPC measurement results of the polyethylene mixture were the same as those obtained in Example 1. However, the temperature at which the obtained film was broken was low due to the absence of a polypropylene therein.

At the time of film formation, the extrusion pressure was high and fluctuations of extrusion amount occurred, so that it was difficult to obtain a uniform film.

Comparative Example 2

A microporous film was obtained in substantially the same manner as in Example 1, except that 13% by volume (23.2% by weight) of powdery silica and 60% by volume (53.9% by weight) of dioctyl phthalate were mixed together in a supermixer to obtain a mixture and 13.5% by volume (11.8% by weight) of an ultrahigh molecular weight polyethylene having a viscosity average molecular weight of 3,000,000 (weight average molecular weight: 1,400,000) and 13.5% by volume (11.1% by weight) of a polypropylene having a viscosity average molecular weight of 400,000 were added to the above obtained mixture. When the thus obtained microporous film was longitudinally drawn by means of a roll drawing machine heated at 120° C. to a length three times the original length, the film was broken. Thus, no sample was obtained.

The GPC measurement of the ultrahigh molecular weight polyethylene employed showed that the ultrahigh molecular weight polyethylene had the following molecular weight distribution:

| molecular weight | weight proportion |
| --- | --- |
| 1,000,000 or more | 40% by weight, |
| 500,000 or more | 62% by weight, |
| 300,000 or less | 25% by weight, and |
| 100,000 or less | 4% by weight. |

The above distribution differs from the specific molecular weight distribution of polyethylene defined in the present invention, and the proportion of the polypropylene is 48.5% by weight, which exceeds 45% by weight, i.e., the upper limit value in the present invention. Consequently, the mechanical strength of the thus obtained microporous film is poor.

Comparative Example 3

A microporous film was produced in substantially the same manner as in Example 1, except that 13% by volume (23.2% by weight) of powdery silica and 60% by volume (53.9% by weight) of dioctyl phthalate were mixed together in a supermixer to obtain a mixture and 13.5% by volume (11.8% by weight) of a polyethylene having a weight average molecular weight of 200,000 and 13.5% by volume (11.1% by weight) of a polypropylene having a viscosity average molecular weight of 400,000 were added to the above obtained mixture. The obtained microporous film was longitudinally drawn by means of a roll drawing machine heated at 120° C. to a length three times the original length, followed by heat treatment at 125° C. for 5 seconds. The characteristics of the thus obtained microporous film are shown in Table 2.

The GPC measurement of the polyethylene employed showed that the polyethylene had the following molecular weight distribution:

| molecular weight | weight proportion |
| --- | --- |
| 1,000,000 or more | 4% by weight, |
| 500,000 or more | 10% by weight, |
| 300,000 or less | 83% by weight, and |
| 100,000 or less | 55% by weight. |

The amount of a high molecular weight fraction having a molecular weight of 1,000,000 or more is relatively small, and the weight proportion of the polypropylene is as high as 48.5% by weight, so that the obtained microporous film has poor mechanical strength. Further, the pore-eliminating temperature is high due to the proportion of the employed polypropylene being high and, therefore, the obtained separator is poor in safety.

Comparative Example 4

The characteristics of "Duragard 2500" (manufactured by Polyplastics K.K., Japan), which is commercially available as a microporous film made of polypropylene, are shown in Table 2. In a safety testing, this microporous film was broken without undergoing any pore disappearance.

Comparative Example 5

Substantially the same procedure as described in Example 8 was repeated, using a single polyethylene having a weight average molecular weight of 200,000 measured by GPC and a polypropylene having a weight average molecular weight of 510,000 measured by GPC. At the time of film formation, large pores were formed in the film and, therefore, no uniform film was obtained and drawing of the film was infeasible.

Comparative Example 6

Substantially the same procedure as described in Example 8 was repeated, except that a single polyethylene having a viscosity average molecular weight of 3,000,000 (weight average molecular weight: 1,400,000) measured by GPC was employed, to thereby obtain a separator. The molecular weight distribution of the polyethylene employed is shown in FIG. 1. The characteristics of the obtained separator are shown in Table 2. The pore-eliminating temperature of this separator is disadvantageously high, presumably because, in the molecular weight distribution of polyethylene, the proportion of a low molecular weight polyethylene fraction having a molecular weight of 100,000 or less is low as compared to the proportion defined in the present invention.

TABLE 1

| | Example No. | | | | | | | | | | |
| --- | --- | --- | --- | --- | --- | --- | --- | --- | --- | --- | --- |
| | 1 | 2 | 3 | 4 | 5 | 6 | 7 | 8 | 9 | 10 | 11 |
| Thickness of film [μm] | 100 | 33 | 38 | 35 | 35 | 35 | 40 | 35 | 36 | 36 | 36 |
| Maximum pore diameter [μm] | 0.13 | 0.18 | 0.22 | 0.20 | 0.21 | 0.20 | 0.45 | 0.20 | 0.21 | 0.22 | 0.21 |
| Porosity [%] | 60 | 61 | 65 | 63 | 60 | 59 | 75 | 61 | 62 | 63 | 62 |
| Air permeability [sec/100 cc · sheet] | 300 | 150 | 80 | 130 | 150 | 140 | 50 | 190 | 180 | 180 | 120 |
| Air permeability after heat treatment at 135° C. [sec/100 cc · sheet] | 850 | 310 | 250 | 270 | 320 | 290 | 130 | 920 | 1700 | 170 | 2400 |
| Pore-eliminating temperature [°C.] | 135 | 140 | 140 | 140 | 140 | 140 | 140 | 135 | 132 | 142 | 130 |

TABLE 1-continued

|  | Example No. | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Film-breaking temperature [°C.] | 170 | 170 | 170 | 170 | 170 | 170 | 170 | 170 | 160 | 172 | 170 |
| Tensile modulus of elasticity | | | | | | | | | | | |
| longitudinal direction [kg/cm$^2$] | 1200 | 5600 | 5300 | 5800 | 5800 | 5900 | 5600 | 6100 | 6000 | 6200 | 5300 |
| lateral direction [kg/cm$^2$] | 1100 | 550 | 510 | 510 | 550 | 570 | 3200 | 620 | 610 | 630 | 510 |
| Polyethylene | | | | | | | | | | | |
| Fraction having a molecular weight of not smaller than 1,000,000 [wt %] | 22 | 22 | 14 | 22 | 21 | 30 | 22 | 20 | 20 | 30 | 10 |
| Fraction having a molecular weight of not smaller than 500,000 [wt %] | 36 | 36 | 25 | 36 | 37 | 47 | 36 | 33 | 33 | 50 | 21 |
| Fraction having a molecular weight of not greater than 300,000 [wt %] | 54 | 54 | 66 | 54 | 51 | 42 | 54 | 55 | 55 | 30 | 70 |
| Fraction having a molecular weight of not greater than 100,000 [wt %] | 31 | 31 | 45 | 31 | 28 | 23 | 31 | 30 | 30 | 6 | 40 |
| Weight average molecular weight of polypropylene × 10$^{-4}$ | 51 | 51 | 24 | 51 | 24 | 24 | 51 | 51 | 51 | 51 | 51 |
| Fraction of polypropylene [wt %] | 32 | 32 | 32 | 11 | 18 | 18 | 32 | 10 | 5 | 10 | 10 |

TABLE 2

|  | Comparative Example No. | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Thickness of film [μm] | 35 | — | 35 | 25 | — | 34 | | | | | |
| Maximum pore diameter [μm] | 0.21 | — | 0.22 | 0.05 | — | 0.22 | | | | | |
| Porosity [%] | 62 | — | 65 | 45 | — | 64 | | | | | |
| Air permeability [sec/100 cc · sheet] | 120 | — | 100 | 190 | — | 110 | | | | | |
| Air permeability after heat treatment at 135° C. [sec/100 cc · sheet] | 920 | — | 100 | 190 | — | 110 | | | | | |
| Pore-eliminating temperature [°C.] | 135 | — | 165 | — | — | 155 | | | | | |
| Film-breaking temperature [°C.] | 150 | — | 170 | 170 | — | 170 | | | | | |
| Tensile modulus of elasticity | | | | | | | | | | | |
| longitudinal direction [kg/cm$^2$] | 3800 | — | 2500 | 7000 | — | 6200 | | | | | |
| lateral direction [kg/cm$^2$] | 550 | — | 320 | 2000 | — | 650 | | | | | |
| Polyethylene | | | | | | | | | | | |
| Fraction having a molecular weight of not smaller than 1,000,000 [wt %] | 22 | 40 | 4 | — | 4 | 40 | | | | | |
| Fraction having a molecular weight of not smaller than 500,000 [wt %] | 36 | 62 | 9 | — | 9 | 62 | | | | | |
| Fraction having a molecular weight of not greater than 300,000 [wt %] | 54 | 25 | 83 | — | 83 | 25 | | | | | |
| Fraction having a molecular weight of not greater than 100,000 [wt %] | 31 | 4 | 55 | — | 55 | 4 | | | | | |
| Weight average molecular weight of polypropylene × 10$^{-4}$ | — | 51 | 51 | — | 51 | 51 | | | | | |
| Fraction of polypropylene [wt %] | 0 | 48.5 | 48.5 | 100 | 32 | 20 | | | | | |

The battery separator of the present invention is not only excellent in safety, but also exhibits excellent chemical resistance, mechanical strength and ion permeability. Accordingly, it is useful in lithium batteries, especially spiral type primary and secondary lithium batteries, in which rapid progress has recently been made, show a rapid and other primary and secondary batteries using an organic electrolytic solution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A separator for a battery using an organic electrolytic solution, which comprises a microporous film comprising a matrix comprised of a mixture of a polyethylene and a propylene polymer having a weight average molecular weight of from 10,000 to 1,000,000, said propylene polymer being present in a proportion of from 5 of 45% by weight, based on the total weight of the polyethylene and the propylene polymer, said polyethylene containing a fraction having a molecular weight of not smaller than 1,000,000 in a proportion of at least 10% by weight, based on the weight of said polyethylene, and a fraction having a molecular weight of not greater than 100,000 in a proportion of at least 5% by weight, based on the weight of said polyethylene, and wherein said microporous film has a thickness of from 10 to 500 μm, a porosity of from 40 to 85% and a maximum pore diameter of from 0.05 to 5 μm.

2. The separator according to claim 1, wherein said fraction having a molecular weight of not smaller than 1,000,000 is from 10% to 80% by weight, based on the weight of said polyethylene, and said fraction having a molecular weight of not greater than 100,000 is from 5% to 60% by weight, based on the weight of said polyethylene.

3. The separator according to claim 1, wherein said matrix further comprises an olefin polymer other than said polyethylene and said propylene polymer, in a proportion of not greater than 30% by weight, based on the weight of said matrix including said olefin polymer.

4. The separator according to claim 3, wherein said olefin polymer is a homopolymer or copolymer of an olefin selected from the group consisting of ethylene, propylene, butene-1, methylbutene and methylpentene.

5. A method for producing a separator for a battery using an organic electrolytic solution, which comprises:

(a) blending a polyethylene, a propylene polymer having a weight average molecular weight of from 10,000 to 1,000,000, inorganic particles, and an organic liquid having a solubility parameter of from 7.7 to 10.0, said propylene polymer being present in an amount of from 5 to 45% by weight, based on the total weight of said polyethylene and said propylene polymer, said polyethylene containing a fraction having a molecular weight of not smaller than 1,000,000 in a proportion of at least 10% by weight, based on the weight of said polyethylene, and a fraction having a molecular weight of not greater than 100,000 in a proportion of at least 5% by weight, based on the weight of said polyethylene, (b) subjecting the resultant blend to extrusion molding to form a film, and (c) extracting said organic liquid and said inorganic particles from said film.

6. The method according to claim 5, wherein in step (c), said organic liquid is first extracted and, subsequently, said inorganic particles are extracted.

7. The method according to claim 5, wherein said fraction having a molecular weight of not smaller than 1,000,000 is from 10% to 80% by weight, based on the weight of said polyethylene, and said fraction having a molecular weight of not greater than 100,000 is from 5% to 60% by weight, based on the weight of said polyethylene.

8. The method according to any one of claim 5, wherein the sum of said polyethylene and said propylene polymer is from 10 to 60% by weight, based on the total weight of said polyethylene, said propylene polymer, said inorganic particles and said organic liquid.

9. The method according to any one of claim 5, wherein in the blending of step (a), an olefin polymer other than said polyethylene and said propylene polymer is incorporated in an amount of not greater than 30% by weight, based on the total weight of said polyethylene, said propylene polymer and said olefin polymer.

10. The method according to claim 9, wherein said olefin polymer is a homopolymer or copolymer of an olefin selected from the group consisting of ethylene, propylene, butene-1, methylbutene and methylpentene.

11. The method according to claim 9, wherein the sum of said polyethylene, said propylene polymer and said olefin polymer is from 10 to 60% by weight, based on the total weight of said polyethylene, said propylene polymer, said olefin polymer, said inorganic particles and said organic liquid.

12. The method according to claim 5, wherein said organic liquid is selected from the group consisting of a phthalic acid ester, a sebacic acid ester, a trimellitic acid ester, a phosphoric acid ester, liquid paraffin and a mixture thereof.

13. The method according to claim 12, wherein said organic liquid is selected from the group consisting of dibutyl phthalate, dioctyl phthalate, liquid paraffin and a mixture thereof.

14. The method according to claim 5, wherein the amount of said organic liquid is from 30 to 75% by weight, based on the total weight of said polyethylene, said propylene polymer, said inorganic particles and said organic liquid.

15. The method according to any one of claim 9, wherein the amount of said organic liquid is from 30 to 75% by weight, based on the total weight of said polyethylene, said propylene polymer, said olefin polymer, said inorganic particles and said organic liquid.

16. The method according to any one of claim 5, wherein said inorganic particles have an average particle size of from 0.005 to 0.5 μm.

17. The method according to any one of claim 5, wherein said inorganic particles are silica particles.

18. The method according to any one of claim 5, wherein the amount of said inorganic particles is from 10 to 50% by weight, based on the total weight of said polyethylene, said propylene polymer, said inorganic particles and said organic liquid.

19. The method according to any one of claim 9, wherein the sum of said polyethylene, said propylene polymer and said olefin polymer is from 10 to 50% by weight, based on the total weight of said polyethylene, said propylene polymer, said olefin polymer, said inorganic particles and said organic liquid.

20. A method for producing a separator for a battery using an organic electrolytic solution, which comprises extracting the inorganic particles from a microporous film comprising a polyethylene, a propylene polymer having a weight average molecular weight of from 10,000 to 1,000,000, and inorganic particles, said propylene polymer being present in a proportion of from 5 to 45% by weight, based on the total weight of the polyethylene and the propylene polymer, said polyethylene containing a fraction having a molecular weight of not smaller than 1,000,000 in a proportion of at least 10% by weight, based on the weight of said polyethylene, and a fraction having a molecular weight of not greater than 100,000 in a proportion of at least 5% by weight, based on the weight of said polyethylene.

21. The method according to claim 20, wherein said fraction having a molecular weight of not smaller than 1,000,000 is present in a proportion of not greater than 80% by weight, based on the weight of said polyethylene, and said fraction having a molecular weight of not greater than 100,000 is present in a proportion of not greater than 60% by weight, based on the weight of said polyethylene.

22. The method according to claim 20, wherein said microporous film further comprises an olefin polymer other than said polyethylene and said propylene polymer, in a proportion of not greater than 30% by weight, based on the weight of said matrix including said olefin polymer.

23. The method according to claim 22, wherein said olefin polymer is a homopolymer or copolymer of an olefin selected from the group consisting of ethylene, propylene, butene-1, methylbutene and methylpentene.

* * * * *